FIG. 1

INVENTORS
SHELDON I. GREENBERG
CALVIN G. NORRIS
SELWYN JONES
EDWARD L. FRITZBERG
BY
James V Harmon

INVENTORS
SHELDON I. GREENBERG
CALVIN G. NORRIS
SELWYN JONES
EDWARD L. FRITZBERG

United States Patent Office 3,531,300
Patented Sept. 29, 1970

3,531,300
PROCESS FOR HEAT TREATING FOOD SEALED WITHIN FLEXIBLE CONTAINERS
Sheldon I. Greenberg, Calvin G. Norris, Edward L. Fritzberg, and Selwyn Jones, Minneapolis, Minn., assignors to The Pillsbury Company, Minneapolis, Minn., a corporation of Delaware
Filed Nov. 17, 1964, Ser. No. 411,777
Int. Cl. A23l 3/10
U.S. Cl. 99—214                                      8 Claims

ABSTRACT OF THE DISCLOSURE

An expandable food product is hermetically sealed within a flexible package and heat treated. The expansion of the package is sensed and the application of external pressure is varied accordingly so as to limit expansion to a prescribed volume. During subsequent heating and cooling the external pressure is adjusted so as to maintain the food product in the expanded state.

---

The present invention relates to a process for cooking, baking or sterilizing foods or combinations thereof while sealed within a package. In a preferred form of the invention, the package comprises a receptacle formed from an imperforate flexible film or sheet material sealed so as to be substantially air tight.

The term "cooking" and "baking" will be used synonymously herein to indicate a process for treating food materials by heat wherein a detectable difference in either flavor or texture, or both, is produced. The term "sterilizing" means treating by heat to free from living microorganisms. In the present process sterilization and cooking may take place simultaneously.

There has existed for many years a need for packaged food products including bakery goods and other farinaceous foods which can be stored indefinitely at room temperature without refrigeration, will be free from contamination by microorganisms and will retain a pleasing taste and texture for a period of from several weeks to several months. These objectives have been successfully accomplished in the case of fruits, vegetables and farinaceous products packed in metal cans and glass jars in a conventional aseptic canning process but the weight and bulk of these containers is particularly objectionable.

According to U.S. Pat. No. 1,010,103, gas generated during baking escapes through pores in a vegetable fiber paper or through unsealed openings and interstices between the overlapping sheets. The existance of such openings, however, also provides a possible entrance for microorganisms, soil or other contaminates, the presence of which will substantially reduce the shelf life of the Wilke product.

According to U.S. Pat. 1,680,898, when bread is to be preserved for a long period of time, it is left in the molds after being baked. A suitable cover is placed on the molds and hermetically sealed before they are put in the oven. A small hole is provided in each cover which is plugged up and sealed as soon as the bread is taken from the oven. The sealing of the holes following baking is considered to be a significant disadvantage in that there will be present an opportunity for microorganisms to enter before the hole is sealed and furthermore, due to the time and effort required to perform this operation production costs are increased. While the disclosure states that in this state the bread will remain fresh for years, it is well known to those skilled in the art that even through bread or other products is kept free from microorganisms and the loss of moisture, an irreversible degradation process takes place. This degradation process is not completely understood, but is believed to be due, at least in part, to the transfer of moisture from the starch to the protein fraction of the bread. Thus, in a short time, the composition tends to become hard and stale, as well as losing its acceptable taste even without contamination by microorganisms.

The Battiste Pats. 2,845,356 and 2,858,220 and Polin Pats. 3,027,262 and 3,063,846 describe processes used for producing pound cake in which a metal can is loaded with a batter and then partially sealed. The batter is baked within the partially sealed container. Following this, the container is completely sealed. Among the disadvantages of the Battiste process is the fact that the cans are relatively heavy and the can closing operation is performed partially before baking and partially following the baking operation. Lactic acid is used to lower pH to enhance sterility but taste is adversely affected by the acid. Moreover, there is an opportunity for microorganisms to enter the container following the baking operation and preceding the sealing operation.

In view of these and other defects of the prior art, it is one object of the present invention to provide an improved cooking or baking process wherein food products packaged within lightweight containers can be readily produced.

A further object of the invention is the provision of an improved process for sterilizing precooked foods in a sealed container which is light in weight but resistant to becoming opened by shock vibration and ordinary handling.

A further object of the invention is the provision of a process wherein food products can be cooked or baked within a package formed from lightweight, flexible, foldable and hermetically-sealed film.

Yet another object of the invention is the provision of an improved cooking or baking process wherein food products can be cooked and sterilized in a package with the packages being sealed hermetically before the cooking or baking operation and not opened either during the baking operation or subsequent thereto until the food contained therein is to be consumed.

A further more specific object of the invention is the provision of an improved cooking or baking process wherein the food product is heated within a flexible enclosure and the pressure produced therein is compensated by the application of external pressure during heating.

Yet another object of the invention is the provision of an improved process for sterilizing the precooked food product within a flexible package by the application of external pressure to the hermetically-sealed package during the sterilizing operation.

A still further object of the invention is the provision of improved package and a sterilized food product therein which is free from viable microorganisms.

Further object of the invention is the provision of an improved cooking and baking process wherein the food product is packaged within a flexible receptacle and means is provided for heating the food therein above the boiling temperature of water.

Yet another object of the invention is a provision of an improved cooking or sterilizing process in which means is provided for elevating the temperature of the food product above the boiling point of water but including a means for preventing degradation of the food product when heated to these temperatures.

A further object of the invention is a provision for heating the product to be cooked to a temperature sufficient to sterilize it without producing sufficient degradation in the product to cause the taste or texture to fall below the standards required by the trade.

Other objects of the invention will become apparent as the description proceeds.

To the accomplishment of the foregoing and related ends, this invention then comprises the features hereinafter fully described and particularly pointed out in the claims, the following description setting forth in detail certain ilustrative embodiments of the invention, these being indicative, however, of but a few of the various ways in which the principles of the invention may be employed.

Briefly stated, a preferred form of the present invention provides a heat treatment process for cooking, baking or sterilizing a food composition of the type containing a material which releases a gas or vapor upon being heated. The term "gas," as used hereinbelow, is intended to include water vapor. The process consists of placing the composition within a package, hermetically sealing the package and heating the package to a temperature sufficient to generate a gas or vapor within the package. The package may or may not be evacuated before sealing. As the package is thus heated, it is allowed to expand to prescribed volume limit beyond which the volume is essentially maintained constant by applying sufficient external pressure to counteract the further expansion of the package so that the walls of the package will not be deflected beyond the point at which they rupture.

In one form of the invention, the externally applied pressure is gradually increased as the temperature within the package increases repsonsive to the transfer of heat thereto. While retained under pressure, the heating of the package is discontinued and the package is cooled. During the cooling operation, the pressure is gradually diminished as the package and its contents are cooled and the package volume has a tendency to decrease.

The invention also relates to the sterilization of food products which have been precooked. While the invention is particularly suited for farinaceous products such as bread, cake, biscuits, cookies, crackers and the like, it can also be utilized in connection with a large variety of products such as fruits, vegetables, meats, eggs, dairy products, herbs and spices, and their by-products.

The invention also provides a cooking apparatus including a receptacle such as a retort or autoclave and a means provided for heating the food product therein to a relatively high temperature and for thereafter quickly removing heat from the cooked food to prevent degradation of the product from exposure to these temperatures. The product is first heated to a temperature sufficiently high to sterilize it. A cooling medium is then preferably introduced to prevent exposure of the food product to temperatures and times sufficient to cause product degradation.

A preferred form of cooking apparatus includes, besides the above mentioned receptacle, a means for supplying heating medium thereto, a recirculating means for maintaining temperature uniformity in the heating and cooling medium and a means for supplying a cooling medium to the receptacle. The apparatus also includes a means for pressurizing the receptacle and a control means for regulating the pressure means. The apparatus will be described in more detail hereinbelow.

Figure 10:
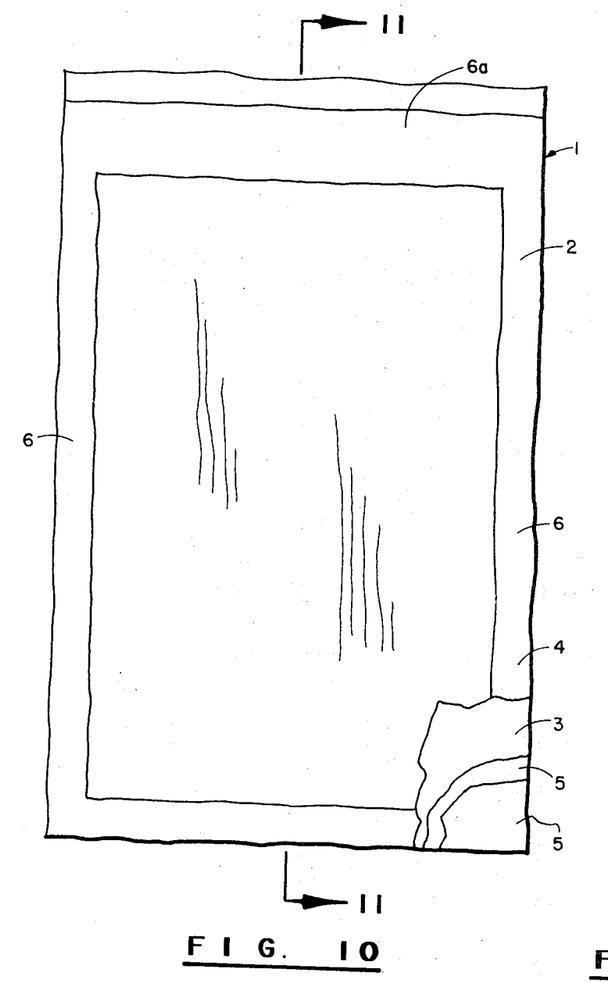
FIG. 10 is a side elevational view of a package of the invention.
Figure 11:
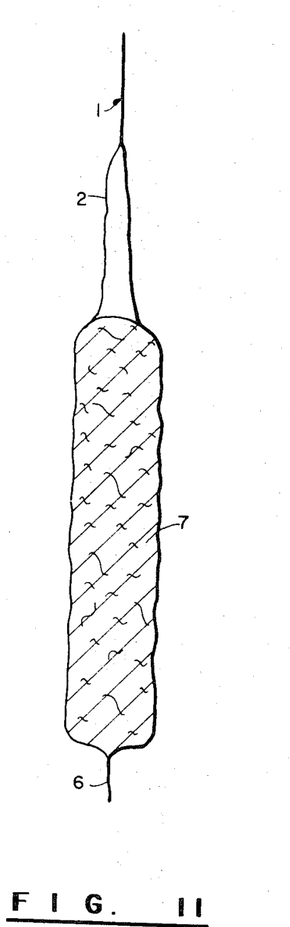
FIG. 11 is a sectional view taken on line 11—11 of FIG. 10.

According to the invention, the package 1 as best seen in FIGS. 10 and 11 is formed from a flexible or semi-flexible sheet material 2 which is imperforate and relatively gas impervious. The package is the type which will burst when subjected to a substantial increase in internal pressure as distinguished from jars, bottles and cans. A number of materials of this type will be apparent to those skilled in the art. In one preferred form of the invention, the package consists of a multi-layer sheet material formed from layers having different properties to provide the combined properties of the several layers. Thus, it has been found that a metal foil laminated to a resinous organic film provides the advantages of both the metal and the resin. One suitable composite sheet material of this type consists of alumnium foil 3 of 0.5 mil in thickness laminated to a polyester film 4 of 0.5 mil in thickness, such as that sold under the registered trademark Mylar by the E. I. duPont Company, Inc., Wilmington, Del., and a third film layer 5 consisting of a polyethylene film of 3.0 mil in thickness. The package is heat sealed along its edges 6. The seals should retain a substantial degree of strength when heated to baking temperature, which may vary from 212° F. to 350° F. For this reason, a high melting point polyethylene film 5 is preferred.

For the purpose of evaluating the invention, pouches measuring 4¾ x 7 inches were produced. These were heat sealed conventionally along each edge 6, the final seal 6a being made after the dough 7 was inserted. Other film materials can be employed if desired, such as a fluorohalocarbon film sold under the trade name Aclar by General Chemical Division, Allied Chemical Corporation of New York. Still another suitable film material consists of a .75 mil Capran polyamide nylon film laminated to Vican dispersion and a 2 mil low density polyethylene film. Laminates of this type are available from the Dowbeckman Company, Midland, Mich.

A variety of food substances could be cooked, baked and sterilized, or both, through the uses of the invention. Among such foods are fruits, vegetables and confectionary, as well as farinaceous materials. Among the farinaceous materials with which the invention is concerned, are bread, cake, biscuits, cookies, crackers and the like.

A variety of ovens or cooking vessels can be employed with the invention. The oven should include a source of heat and control means for regulating the heat. Preferably, a cooling means is also provided. A means is provided for applying fluid pressure within the cooker and a pressure control means for maintaining the pressure within the chamber at selected levels during different portions of the cooking cycle. The fluid can comprise either a gas or a liquid.

Among the many types of ovens or cooking vessels which can be applied in connection with the invention are gas fired ovens, eletcric ovens, microwave ovens such as the Mark V Radarange, sold by Raytheon, Inc. of Waltham, Mass., as well as steam cookers, autoclaves or hot water cookers. A preferred form of hot water cooker will now be described in connection with FIGS. 1, 2 and 3.

Figure 1:
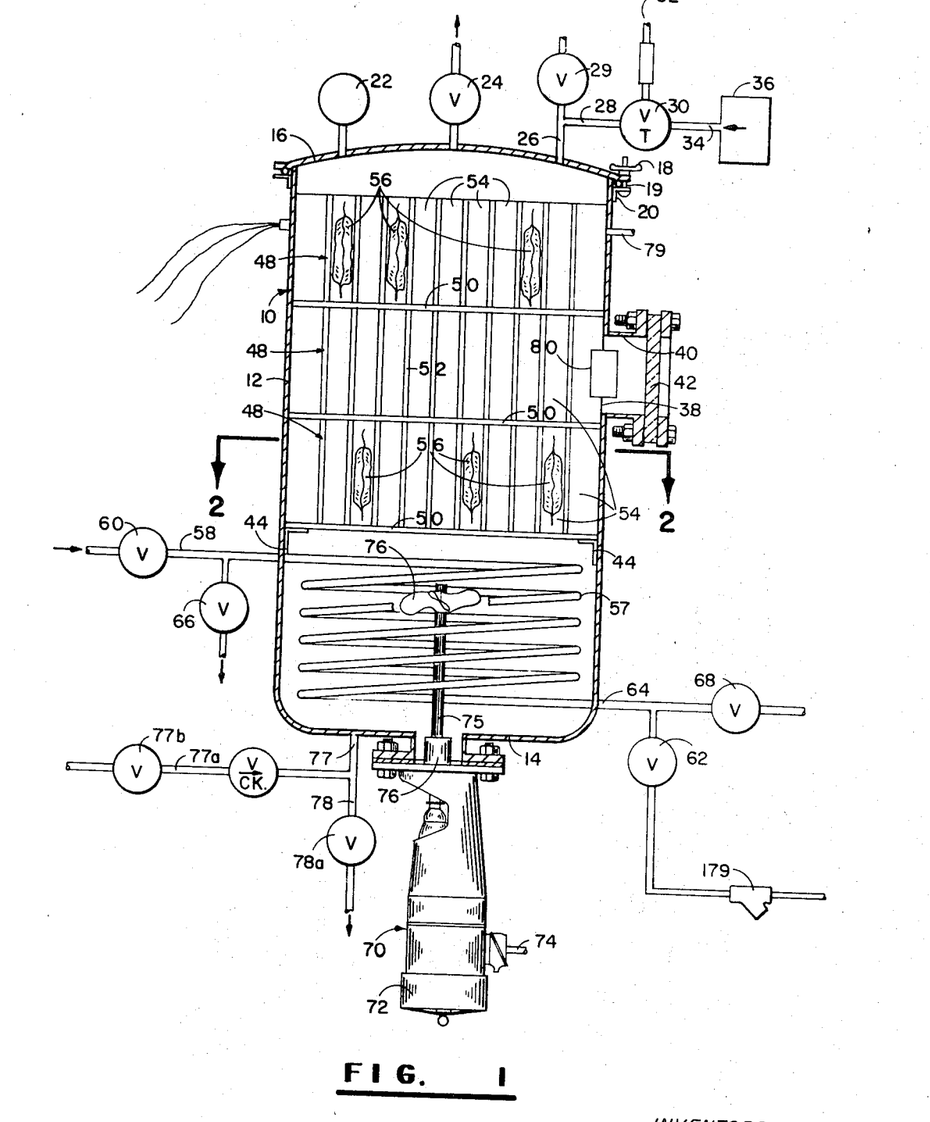
FIG. 1 is a central vertical cross sectional view of one form of cooking or sterilizing vessel in accordance with the invention.
Figure 2:
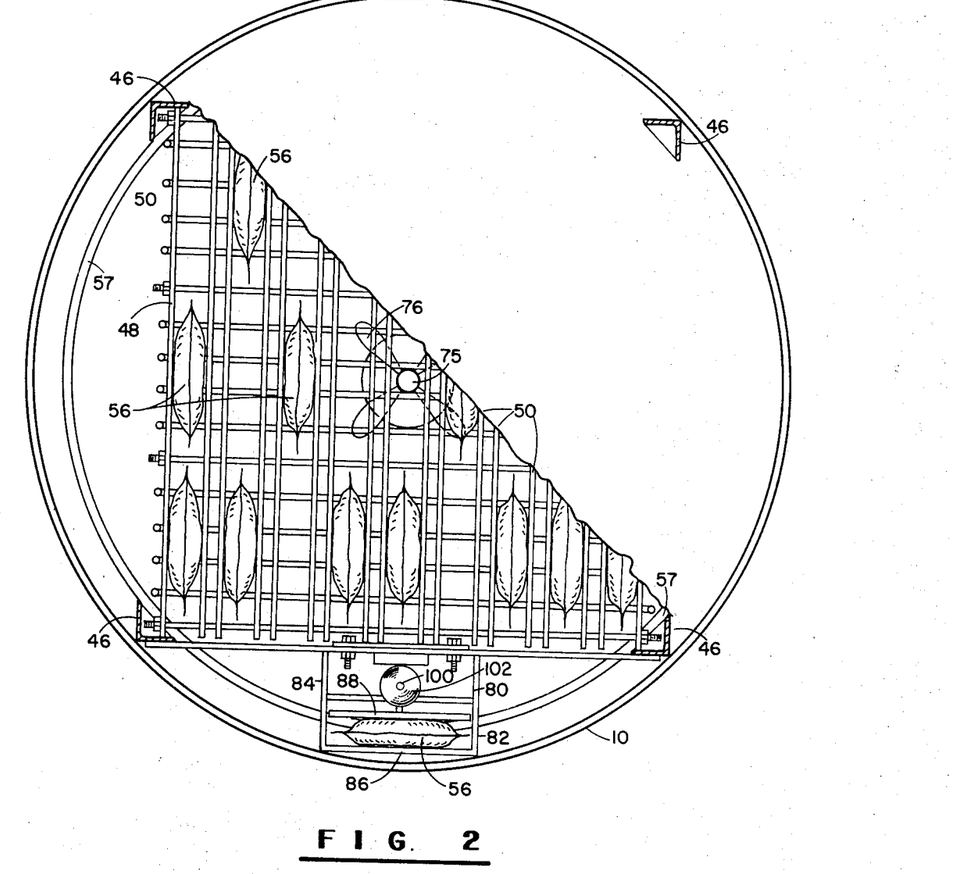
FIG. 2 is a horizontal cross sectional view taken on line 2—2 of FIG. 1.

As can be seen in FIG. 1, there is provided a retort 10 consisting of a vertically disposed cylindrical steel tank having a side wall 12, a bottom wall 14 and a removable cover 16, which is held in place during operation by means of retainers such as screws 18 which are threaded at 19 within brackets 20, which are mounted circumferentially on the upper end of the retort 10. By placing the fasteners 18 in position and turning the handles at their upper ends, cover 16 can be securely locked and positioned. The retort 10 is provided with a pressure gauge 22, a pressure release valve 24, both of which are connected to the cover 16. A duct or pipe 26 is provided for supplying a pressurizing medium such as air to the upper end of the tank. Connected to the pipe 26 is a pipe 28 having a pressure control valve 30, which is regulated by means of air or other medium supplied through a pipe 32. Also connected to duct 26 is a safety valve 29. Air or other gas or fluid medium is supplied to the valve 30 through a pipe 34 from a source of fluid under pressure 36. The retort 10 includes an opening 38 having a pipe 40 connected thereto to the end of which is fastened a glass window 42 which serves as an inspection port.

Within the retort 10 is a support means comprising horizontally disposed angle irons 44 (FIG. 1). Extending upwardly from the horizontal angle irons 44 are four equally spaced parallel angle irons 46 (FIG. 2) which serve as guides for three supporting racks 48. The racks 48 each includes a plurality of horizontally disposed frame members such as rectangular bars 50 and a plurality of vertically disposed bars 52 welded or otherwise secured to the bars 50. The bars 50 and 52 are properly spaced to provide a compartment 54 within which the packages 56 containing the food to be cooked are placed.

In the bottom of the tank 10 below the support 44 is a heat supply means such as a heat exchanger 57 formed from a helically wound tube to which a suitable heating fluid such as steam is supplied through a line 58. Control of the steam entering line 58 is provided by means of an inlet control valve 60 and a coolant return valve 66. The opposite end of the exchanger 57 is connected to a line 64 coupled to an outlet control valve 62 and a cooling water inlet valve 68. At the bottom of the tank 10 is provided a circulating means for carrying a heat transfer medium such as water with which the tank is filled to just cover the supporting racks. The circulating means indicated generally at 70 comprises a motor 72 to which current is supplied through conductors 74. The shaft 75 of the motor 70 extends upwardly through a rotary seal 76 and has secured to its upward end, a water circulating propeller 76. It will thus be readily seen that during operation the motor will impart circulating movement to the heat transfer medium within the tank 10.

Figures 3, 4:
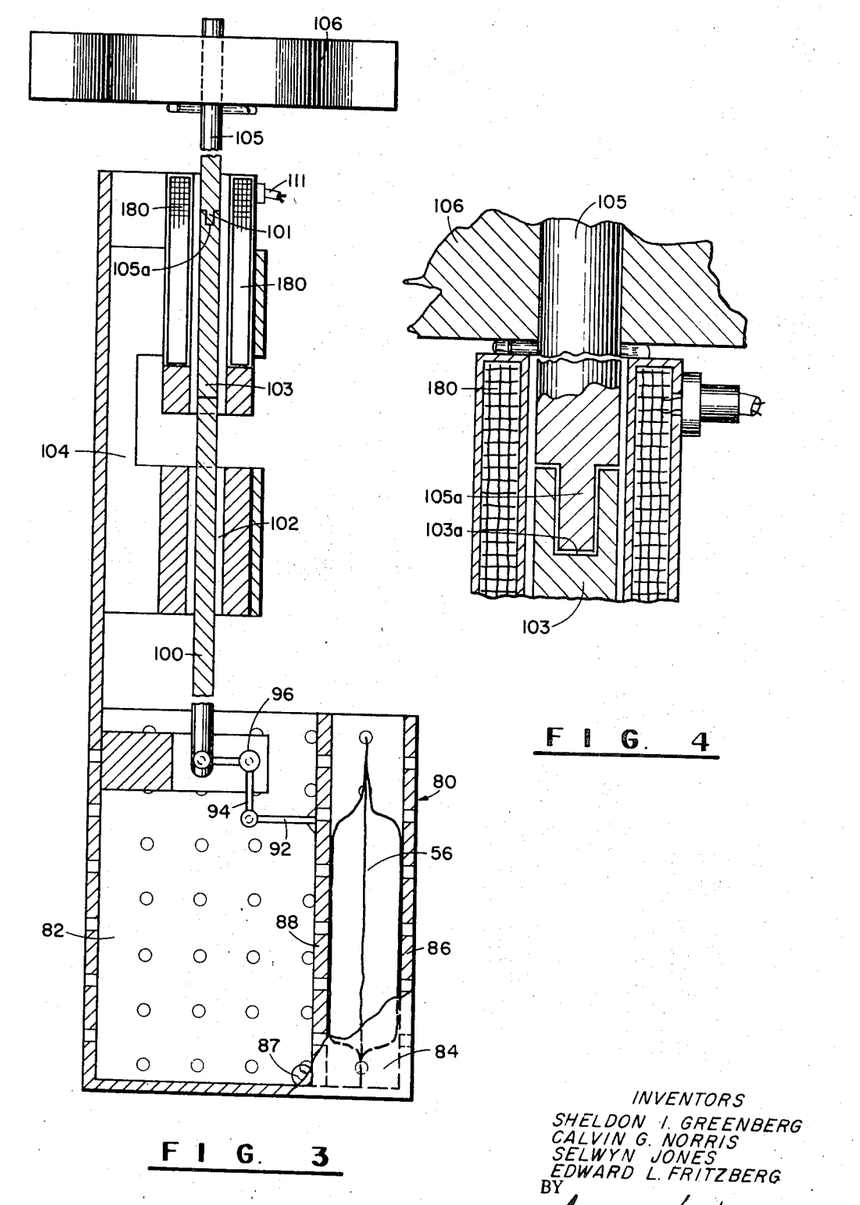
FIG. 3 is a vertical sectional view of the pressure sensing apparatus of the invention.
FIG. 4 is a partial vertical sectional view of the pressure sensing apparatus of FIG. 3.

FIGS. 3 and 4 illustrate a preferred form of pressure sensing apparatus in accordance with the invention. As is clearly shown, the sensor comprises a cage or holder 80 which is open at its upward end and includes three vertically disposed and mutually perpendicular sidewalls 82, 84 and 86. The cage also includes a hinged wall 88 which is mounted for a pivoting movement around hinge 87. During operation, one of the packets 56 in all respects similar to the packets 56 placed within the racks 48 is mounted in the cage 80, between hinged wall 88 and rigid wall 86. Connected to the hinged wall 88 is a horizontally extending arm 92. Pivotally connected to arm 92 is an L shaped link 94 which is supported at its center upon a pivot 96. Extending upward from the horizontal arm of link 94 is a non ferrous rod 100 which is slidably mounted within a vertically disposed vertically bored guide 102 in the support bracket 104. At the upward end of the rod 100 is a ferrous rod 103. At the upward end of rod 103 is a depression 103a within which rests an extension 105a at the lower end of a rod 105 formed from a non ferrous material. Integral with bracket 104 is a linear variable differential transformer 180 to be described hereinbelow. Mounted upon the upper end of rod 105 is a weight 106 which serves as a means for yieldably maintaining the wall 88 in a predetermined position to which package 56 is allowed to expand. In operation, expansion or contraction of the package 56 within the cage 80 beyond this predetermined limit will cause an upward or downward movement of the rods 100, 103 and 105 and weight 106. The movement of the rod 103 is in turn transmitted as an electric signal through conductors 111.

Figure 5:
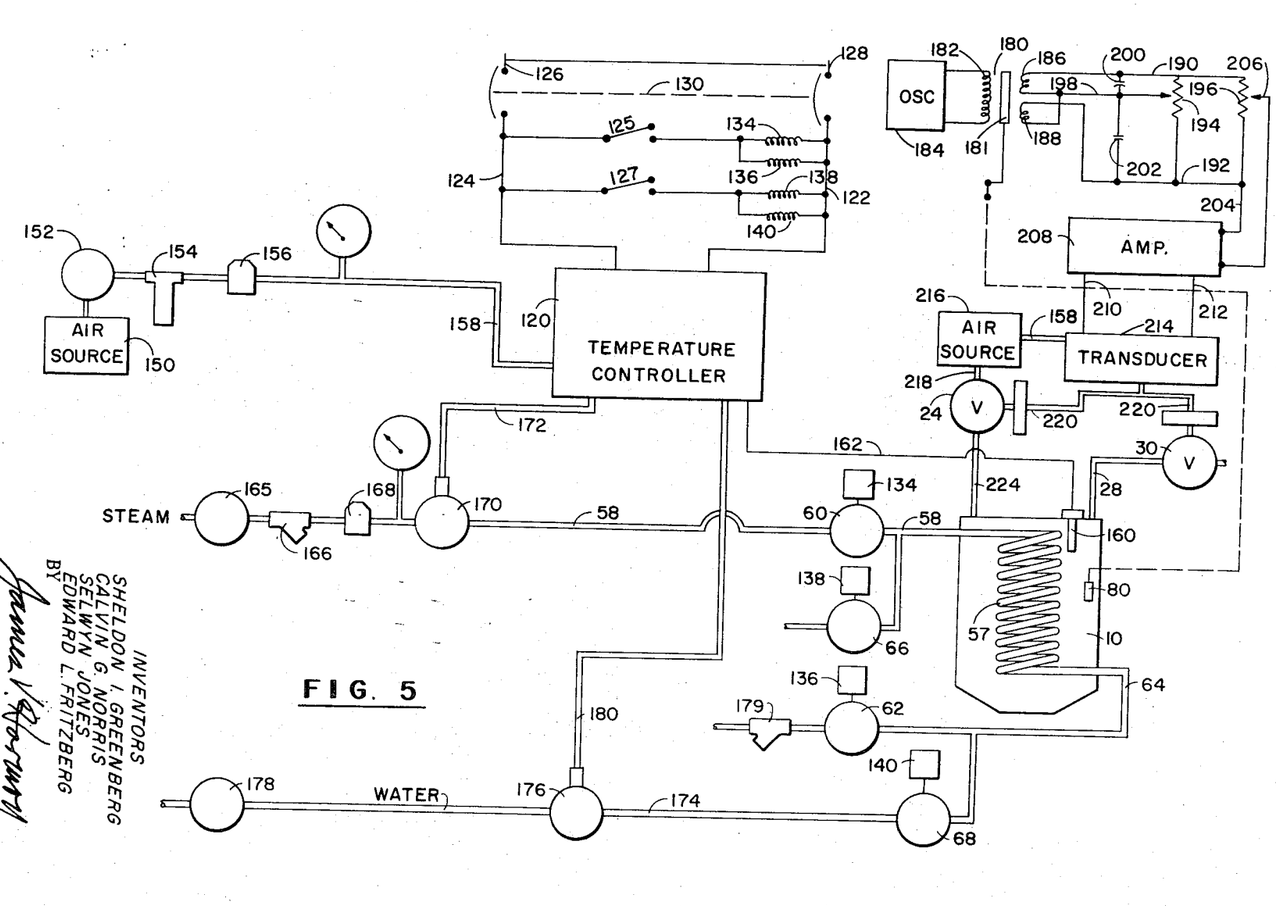
FIG. 5 is a combined electrical and pneumatic and heating schematic of the cooking apparatus in accordance with the invention.

Refer now to FIG. 5 which illustrates a preferred form of control in accordance with the invention. In FIG. 5 there is shown temperature controller 120 of any suitable and commercially available type such as a Taylor Instrument Company Ful-flex controller manufactured by the Taylor Instrument Company of Rochester, N.Y. Electric power is supplied to the controller through conductors 122 and 124 from a commercial power source depicted by lines 126 and 128. A double pole circuit breaker 130 is provided in lines 126 and 128. Connected across lines 122 and 124 is a first pair of solenoids 134 and 136 which are integrally housed and connected with normally closed valves 60 and 62. The second pair of solenoids 138 and 140 are wired across lines 122 and 124 and are integrally housed and connected with normally closed valves 66 and 68. When potential is present across lines 122 and 124 and contact 127 is closed and 125 is open, valves 60 and 62 will be closed. Under the same conditions, valves 66 and 68 will be open. It can readily be seen then that when the potential is established between lines 122 and 124, and contact 125 is closed and contact 127 open, the operation of solenoids 134 through 140 will open valve 60 and 62, and will close valve 68 and 66.

Any of various temperature controllers can be provided at 120. A preferred controller is of the pneumatic type. Accordingly, a source of pressurized air 150 is connected to a shut-off valve 152 through an air filter 154, a pressure regulator 156 of suitable known construction and line 158 to provide the electrically powered temperature controller 120 with the air necessary for operation. Temperature information is supplied from the cooker 10 by the provision of a sensing unit 160 which is connected to the controller (as shown by) 162. A preferred sensing unit is the filled bulb type.

One method for cooling the retort will now be described as seen in FIG. 1. A cooling medium such as refrigerated water close to its freezing point can, if desired, be introduced to the tank 10 through a line 77. The water cooling medium is fed to line 77 through a line 77a to which is connected a manual shut-off valve 77b. Also connected to the line 77 is a drainline 78 having a manual shut-off valve 78a which can be opened to drain the tank 10 when required. Thus, by opening the valve 77b, a cooling medium such as cold water is introduced into the tank 10. The hot water within the tank passes out through the overflow line 79 and a float controlled trap (not shown). Cooling can also be accomplished by an alternative procedure which will now be described.

As can be seen in FIG. 5, when the heating cycle is complete and it is desired to cool the product in the retort 10, for subsequent removal, the manual switch on controller 120 is turned to the "cooling" position. This action results in solenoids 134 and 136 being de-energized causing valves 60 and 62 to close and solenoids 138 and 140 to be energized, causing valves 66 and 68 to open. The control valve 176 is suitably connected to controller 120 and will control the amount of cooling water flowing in coil 57 to cool the heat transfer medium in retort 10, in accordance with the rate set on controller 120.

As mentioned hereinabove, steam is fed to a steam inlet line 58 from a suitable boiler (not shown) through a manual shut-off valve 165, a strainer and blow-off device 166, pressure reducing valve 168 and air operated steam control valve 170. Valve 170 is connected to the temperature controller by means of compressed air lines 172. Thus, during operation, the air pressure provided through the line 172 will control the steam flow through the valve 170 into the coil 57. As the steam enters the coil 57, it will condense and the water thus formed will be expelled through the line 64 and valve 62. It will then pass through steam trap 179 to a drain. The cooling valve 176 is suitably connected to the controller as by means of an air line 180. Thus, changes in the air pressure within line 180 as called for by the controller 120 will cause corresponding changes in the extent to which the valve 176 opens.

The heating and cooling rate of the retort 10 in accordance with the invention can be varied by a temperature controller 120 which will allow the temperature to be raised from between about 0.5° F. and 8° F. per minute. Generally, for the purposes of the invention, a rise in temperature of about 4 to 6 degrees per minute during the initial heating is preferred within the retort 10. The controller 120 can also be provided with a hold period during the intermediate portions of the cooking cycle and a final cooling stage in the cycle during which the cooling rate can be regulated between about a 0.5° F. and 8.0° F. per minute. In practice, it has been found that an intermediate hold period is not required in the case of farinaceous products and that the cooling can be begun as soon as the peak cooking temperature of from 200° F. to 350° F. is achieved. A peak temperature of about 250° F. is preferred.

Figure 6:
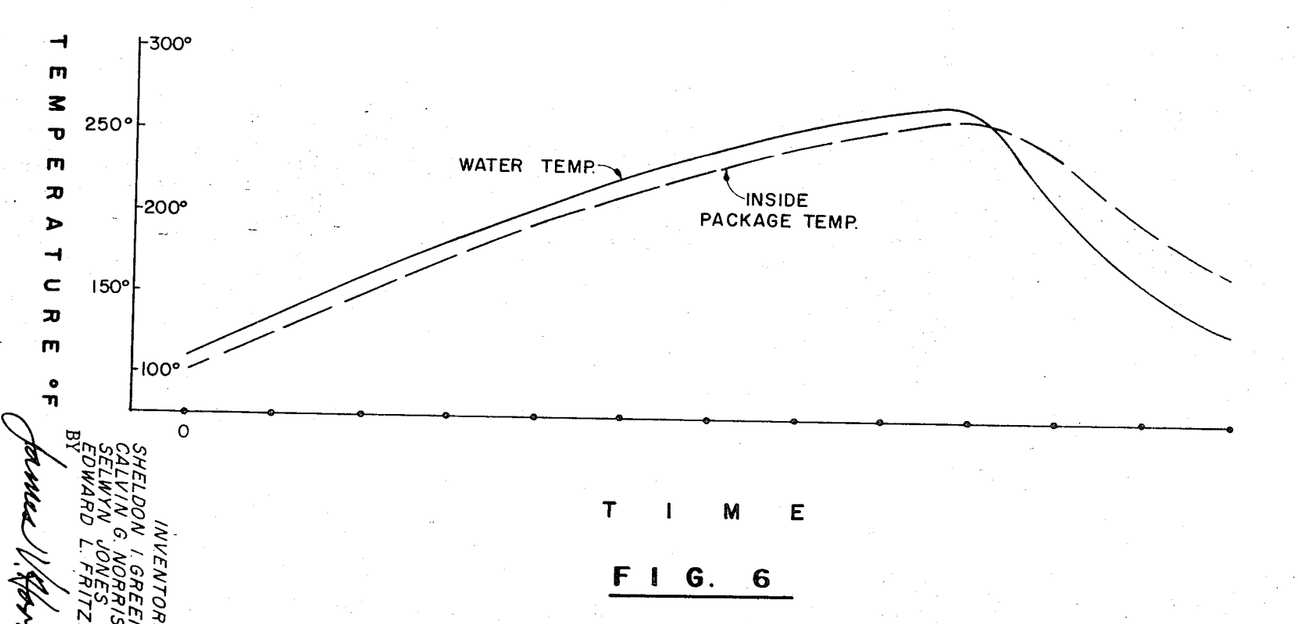
FIG. 6 is a graph illustrating the changes in temperature of the package and water in the cooking vessel during a complete cycle of operation.

Reference should now be made to FIG. 6 in which the water temperature and inside package temperature are plotted against time. As can be clearly seen in the figure, the water temperature is at all times slightly above the inside package temperature during the heating portion of the cycle, that is to say, the left hand portion of the graph in which the temperature is rising. After the temperature within the package has risen to the desired peak temperature as for example about 250° F., the heating is interrupted and the tank is rapidly cooled hereinabove thus causing the water temperature and inside package temperature to drop as shown at the right in the figure.

The pressure within the tank 10 as seen in FIG. 5 is controlled in the following manner. As explained hereinabove, a pressure sensing system such as contained in cage 80 is provided within the tank 10. The sensing means is a movable wall 88 operatively connected to the transformer 180 (FIGS. 4 and 5) having a primary 182 wired to an oscillator 184. The oscillator 184 is preferably one which will produce a signal at a frequency other than a multiple of 60 cycles to reduce power line interference. A suitable oscillator can for example produce a 500 cycle frequency of suitable magnitude. The secondary of the transformer 180 comprises two windings 186 and 188, connected at opposite terminals to conductors 190 and 192. Between the conductors 192 and 190 is wired a nulling potentiometer 194 and a gain potentiometer 196. Connected to the other terminals of the windings 186 and 188 is a conductor 198 to which is secured the slide arm of the potentiometer 194. Between the conductor 198 and 190 and conductor 192 and 198 are provided a pair of identical filter condensers 200 and 202. Connected between the potentiometer 196 and conductor 192, by means of conductors 204 and 206, is an amplifier 208.

Wired to the ampliler 208 by means of conductors 210 and 212 is a transducer 214 for converting electrical signals to signals in some other energy medium. In this system, the conversion is to pneumatic signals. To this end, compressed signal air is supplied from an air source 150 to the transducer 214 through a duct 158. The output of the transducer 214 is supplied through airlines 220 to the air operated air inlet control valves 24 and 30. Valve 24 is also connected to the power air source 216. Air flows downwardly to the retort 10 through the line 224 when the valve 24 has been opened. Air is removed form retort 10 through a line 28 to the valve 30 (which exhausts to atmosphere) to reduce pressure in the retort.

During operation, best seen in FIGS. 3 and 4, when the entrapped gases formed by the packaged food product increases in volume, rod 103 within the transformer 180 will be moved further from its central position, thereby increasing the voltage to the amplifier 108 and transducer 214. This in turn will cause a greater opening of the valve 24, allowing compressed air to enter, so as to provide a compensating external pressure within the tank 10. Likewise, when the package 56 decreases in size due to condensation of the moisture therein during the cooling portion of the cooking cycle, the decrease in size will be detected by the sensing means 80 and the rod 103 will be partially removed a corresponding distance in the transformer 180. The voltage will thereby be reduced to the amplifier 208 and the valve 30 opened in direct proportions thereto, thereby reducing the pressure within the tank 10. The pressure within the retort 10 is thus controlled automatically. The pressure is not sensed directly but is detected from the flexing of the pouch. As gas is generated in the pouch, and the rising temperature causes it to expand, the expansion is detected by the rod or core 103 being moved due to the action of pivoting wall 88. The magnitude of the alternating voltage signal from the transformer 180, which is proportional to the distance the core is moved, is amplified and rectified to a D.C. signal. It is then fed into a transducer 214 to convert the electrical signal into a proportional pneumatic signal that is compatible with that required to position air inlet and exhaust valves. As the pressure increases in the pouch, the rod 103 will move and the exhaust valve will start closing. The valves are used in a staggered mode such that the exhaust valve will, for example, close on 3–9 p.s.i. signal and the intake pressure valve will open in 9–15 p.s.i. signal. The system is at an equilibrium condition when both valves are closed. When the pressure builds up in the retort 10, the flexible pouch will be compressed and the rod 103 will move back to equilibrium position resulting in the pressure valve and exhaust valve being closed.

When the cooling cycle takes place and the internal pressure decreases in the pouch, the rod 103 will move downwardly, thus causing the exhaust valve to open with a resulting reduction in overriding pressure on the pouch. As the overriding pressure fails, the rod 103 will be retured to its equilibrium position by the expansion of the pouch and both valves will again be closed.

The gain potentiometer 196 will enable the valves to be operated through their full range with different lengths of movement of the rod 103; in other words, with different amounts of expansion of the pouch.

The present invention also contemplates the use of different forms of heating energy in succession. For example, the invention can be practiced with the initial cooking performed by an ordinary bread baking oven and the baked bread then placed in the packages, sealed and sterilized in accordance with the invention.

The initial or pre-cooking can also be provided by microwave energy. For this purpose we prefer to use a commercially available baking oven such as the Mark V high frequency microwave baking oven of the type manufactured by Raytheon, Inc. of Waltham, Mass., which generates microwave energy at about 2450 megacycles. In preliminary microwave baking tests, using a plastic film pouch formed from a polyester resin and sold under the trade name Acrylar by Minnesota Mining and Manufacturing Company, St. Paul, Minn., it was found that the dough pieces could be baked from about 5 to 20 seconds. It was also found that without pressurization, some of the sample packages burst when using a sodium acid pyrophosphate in sodium acid phosphate leavening system. The crusts of the bread samples produced in sealed pouches that did not break were found to be very moist because the contact with the water condensates from baking. After storage for 18 hours at 100° F. the moisture was re-absorbed. The average crumb moisture of these products was 36% as compared with 28% for baked bread in open pouches at 300° F. for 30 minutes in the conventional manner. Bread volumes were similar to those obtained with the conventional baking method. Although symmetry, crumb texture and crumb grain were acceptable, the crust and crumb color were as white as the original dough piece.

Figure 7:
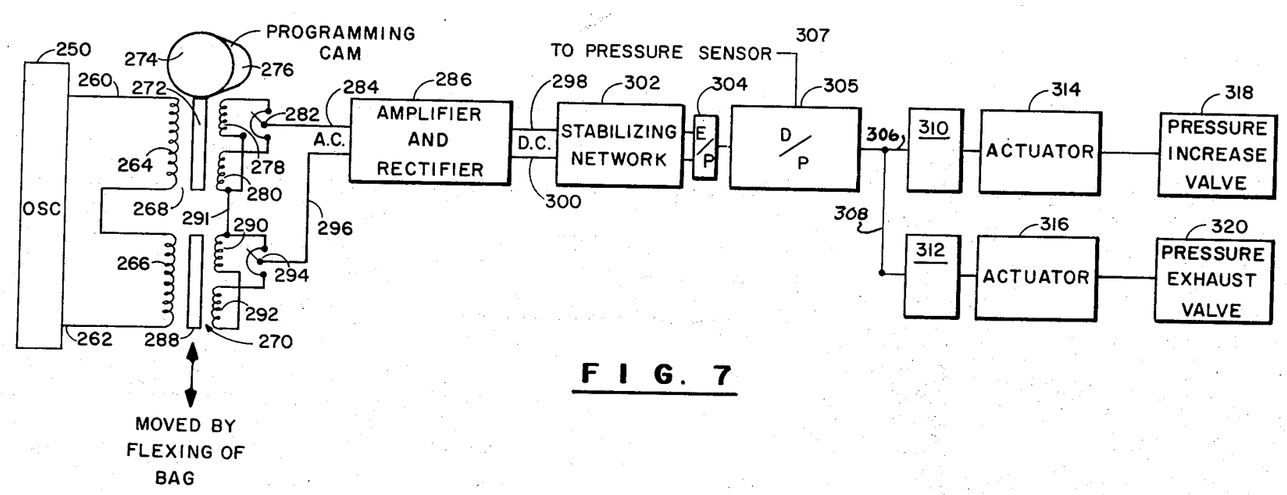
FIG. 7 is a modified form of pressure control circuit in accordance with the invention.
Figure 8:
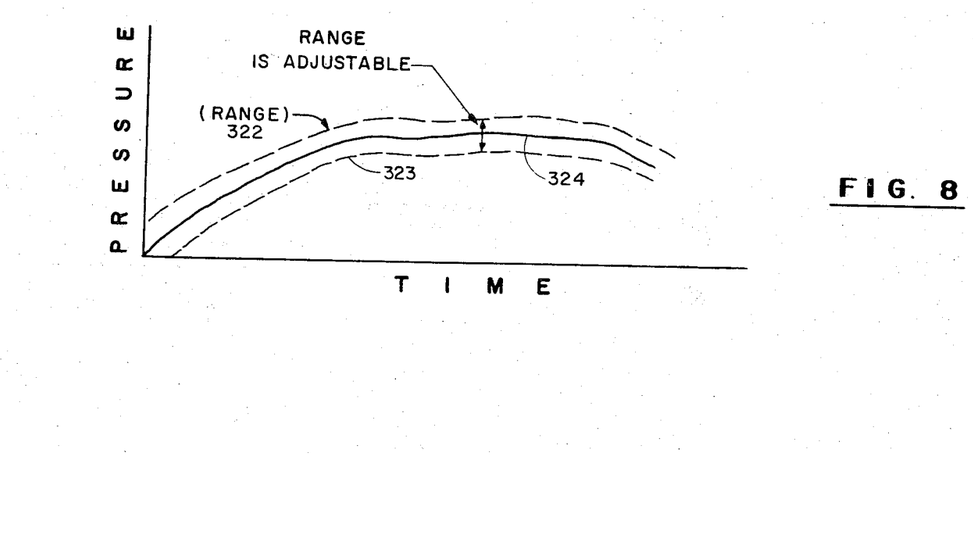
FIG. 8 is a graph illustrating changes in pressure within the cooking vessel as a function of time when the pressure control circiut of FIG. 7 is employed.

Refer now to FIGS. 7 and 8 which illustrate an alternative form of pressure control in accordance with the invention.

The controller of FIG. 7 comprises an oscillator 250 connected by means of conductors 260 and 262 to primary windings 264 and 266 of transformers 268 and 270 respectively. The transformer 268 includes a movable core 272 operatively associated with a programming cam 274 having a lobe 276. The secondary of transformer 268 includes two windings 278 and 280 both coupled in series with a potentiometer 282 having a slide arm connected by means of a conductor 284 to an amplifier and rectifier 286, and also connected electrically by conductor 291 to transformer 270.

The programming cam 274 is operated by a suitable drive means (not shown) which turns the cam once for each complete cooking cycle which in practice will last from about 20 minutes to an hour and 20 minutes. The transformer 270 which is identical to the transformer 268 also includes a moveable core 288 and secondary windings 290 and 292, both of which are connected in series with a trimming potentiometer 294. The slide arm of the potentiometer 294 is connected by means of a conductor 296 to the amplifier and rectifier 286. The latter is connected by means of conductors 298 and 300 to a stablizing network 302 transducer 304 for converting electric energy to another form of energy, summing device 305, and pressure sensor 307 all of known construction. The outlet of the transducer 305 is fed through ducts 306 and 308 to valve positioners 310 and 312 respectively. The outlet of the valve positioners is fed through suitable ducts to actuators 314 and 316 respectively which feed in turn to a pressure increase valve 318 and a pressure exhaust valve 320 for controlling the flow of compressed air into and out of the retort 10.

In operation, the signal from the oscillator will produce a current through the primaries 264 and 266 which will be induced into the secondaries and thence through conductors 284 and 296 as determined by the position of the programming cam 274 and by the position of the flexible pouch which is operatively connected to the core 288.

With reference to FIG. 8, it will be seen that during operation of the control circuit of FIG. 7, the turning of the cam 274 will determine the approximate pressure at which the retort should operate as depicted by solid line 324. The flexing of the bag 56 and consequent change in position of the core 288 will provide a fine control within the range indicated by dotted lines 322 and 323. By adjusting the potentiometers 282 and 294, the relative effectiveness of the signals from each of transformers 268 and 270 can be selected. In this way the range between 322 and 323 can be either widened or narrowed. The foregoing technique would be useful where pressure changes in the pouch were very rapid and control system stability became a problem.

Figure 9:
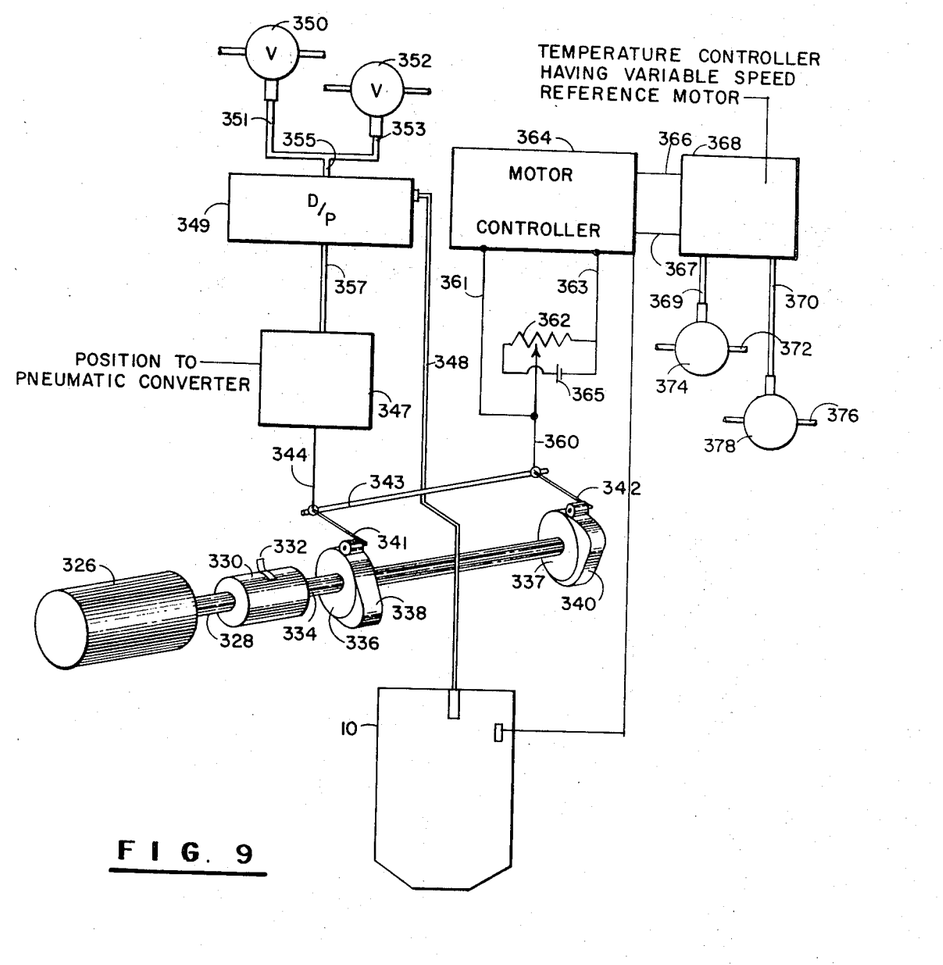
FIG. 9 is a further modified form of temperature and pressure control in accordance with the invention.

Refer now to FIG. 9 illustrating another modified form of controller in accordance with the present invention which would be applicable where the build up of pressure in the flexible bag is predictable and repeatable.

The controller of FIG. 9 comprises a drive motor 326 having an output shaft 328 connected to a gear production unit 330 for changing the speed of the output shaft 334. The shaft 334 has connected to it a pair of cams 336 and 337, which includes lobes 338 and 340 respectively. The lobes 338 and 340 are cut in accordance with empirical data. Upon the cams 336 and 337 are mounted followers 341 and 342 respectively, each of which is connected to a stationary pivot 343. The cam lobes 338, comprising a programmed control for regulating the pressure within the retort 10 and lobe 340 provides a programmed control for regulating the temperature within said vessel. Extending upward from the follower 341 is an arm 344, the movement of which causes a position to pneumatic converter 347 to give a pneumatic output proportional to the movement of its input shaft 344. The signal from output 357 of the position to pneumatic converter 347 is transmitted to differential pressure cell 349 through duct 348. The output 355 of the differential pressure cell 349 is proportional to the difference between the incoming signals in ducts 357 and 348. Output duct 355 is connected to ducts 351 and 353 which are connected respectively to a pressurizing air inlet valve 350 and an air outlet valve 352, each of which is coupled to the retort 10 in the same manner as the valves 24 and 30 respectively.

Connected to the follower 342 is a slide wire arm 360 of a potentiometer 362 receiving excitation from power source 365 and delivering a voltage signal proportional to follower movement through conductors 361 and 363 to a motor controller 364 of known construction. The output of the motor controller 364 is transmitted to a variable speed reference motor in a temperature controller 368 of known construction. Temperature controller 368 is connected to a steam control valve 374 and a coolant control valve 378 in the same manner and with the same operation as described previously for valves 170 and 176.

During operation of the apparatus of FIG. 9, the shaft 334 will rotate once for each cycle of operation of the retort 10. The movement of the follower 341 and arm 344 will control the pressure applied to the retort through valves 350 and 352 while the follower 342 and slide arm 360 will control the amount of steam admitted and the resultant temperature of the retort 10. It should be readily apparent, that in the apparatus of FIG. 9, no cage is required for sensing the expansion or contraction of one of the pouches 56.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A process for preparing a heat treated expanded food product having a porous character within a flexible, hermetically sealed package formed from a flexible imperforate and relatively gas impervious sheet material comprising the steps of placing a food product capable of expanding to a porous product within the flexible package, hermetically sealing the package, heating the food product to a sufficient temperature to effect the desired heat treatment and expansion thereof, providing a programmed control variable for establishing a pressure range selected to provide desired cooking conditions at different times in a complete cooking cycle, detecting the deflection of said package during the cooking cycle, adding the changes in the programmed variable and changes detected in the expansion of the package and controlling the pressure within the vessel in accordance with the changes in the sum of the programmed variable and the detected deflection to permit limited expansion of the package and food product.

2. A process for preparing a heat treated expanded food product having a porous character within a flexible, hermetically sealed package formed from a flexible imperforate and relatively gas impervious sheet material comprising the steps of placing a food product capable of expanding to a porous product within the flexible package, hermetically sealing the package, placing the package in a cooker, providing a programmed temperature control range, increasing the temperature of the cooker during the first part of the cooking cycle in accordance with the programmed control rate and after the temperature of the food product has attained a predetermined temperature peak withdrawing the heating medium from the cooker and introducing cooling medium, and throughout the cooking cycle sensing the expansion of said package and varying the application of external pressure upon said package directly in accordance with changes in the expansion of said package to permit limited expansion of the package and food product.

3. A process for preparing a heat treated expanded food product having a porous character within a flexible, hermetically sealed package formed from a flexible imperforate and relatively gas impervious sheet material comprising the steps of placing a food product capable of expanding to a porous product within the flexible package, hermetically sealing the package, heating the food product to a sufficient temperature to effect the desired heat treatment and expansion thereof, sensing the expansion of the package and allowing the package to expand to a prescribed volume which is less than the point at which the sheet material of the package ruptures, preventing the expansion of the package beyond said prescribed volume limit by applying a counterbalancing external pressure to the outside of the package to prevent the gas pressure generated within the package due to the applied heat from rupturing the sheet material and continuing to control the external pressure to prevent substantial changes from the expanded volume throughout the continued heating and subsequent cooling of the package after heating is discontinued.

4. The process according to claim 3 wherein the food product is heated to a sufficient temperature for a period of time necessary to effect cooking of the food product.

5. The process according to claim 3 wherein the food product is heated for a sufficient period of time and to a sufficient temperature to effect sterilization of the food product.

6. The process according to claim 3 wherein a cooling medium is applied to the package to rapidly lower the temperature thereof after the heating is discontinued and the counterbalancing external pressure is varied continuously during the cooling of the package to maintain the package substantially at its expanded volume whereby the pore structure of the food product will not be damaged by the external pressure.

7. The process according to claim 6 wherein the cooling medium comprises cold water.

8. The process according to claim 3 wherein the expansion and contraction of at least one of said packages is sensed and the counterbalancing external pressure is varied responsive to the sensed expansion and contraction of said package whereby the externally applied pressure will vary throughout the heating and cooling of the package to maintain the package at its expanded volume.

References Cited

UNITED STATES PATENTS

| | | | |
|---|---|---|---|
| 1,485,133 | 2/1924 | White | 99—214 |
| 2,380,134 | 7/1945 | Waters | 99—214 |
| 2,472,970 | 6/1949 | Hanna | 99—370 |
| 2,816,841 | 12/1957 | Kaap | 99—214 |
| 3,285,710 | 11/1966 | Corrigan | 99—7 |
| 2,564,221 | 9/1951 | Hornfeck | 73—398 X |
| 3,089,081 | 5/1963 | Brosh | 336—30 X |

FOREIGN PATENTS 809,329   2/1959   Great Britain.

A. LOUIS MONACELL, Primary Examiner

S. B. DAVIS, Assistant Examiner

U.S. Cl. X.R.

21—56, 94; 99—86, 171, 325, 370